US005807918A

United States Patent [19]
Carter

[11] Patent Number: 5,807,918
[45] Date of Patent: Sep. 15, 1998

[54] COLOR CHANGEABLE AQUEOUS ADHESIVE SYSTEMS

[75] Inventor: Marlo Carter, Roanoke Rapids, N.C.

[73] Assignee: Patch Rubber Company, Roanoke Rapids, N.C.

[21] Appl. No.: 622,113

[22] Filed: Mar. 26, 1996

[51] Int. Cl.[6] .............................. C08K 3/04; C08L 93/04; C09J 107/02; C09J 109/00
[52] U.S. Cl. ..................... 524/495; 524/270; 524/272; 524/274; 524/496; 524/518; 524/528
[58] Field of Search ................................ 524/270, 271, 524/272, 273, 274, 495, 496

[56] References Cited

U.S. PATENT DOCUMENTS

| | | | |
|---|---|---|---|
| 4,160,752 | 7/1979 | Akiyama et al. | 524/274 |
| 4,338,263 | 7/1982 | Elmer | 524/508 |
| 4,374,941 | 2/1983 | Sandstrom | 524/495 |
| 4,409,359 | 10/1983 | Tanimura et al. | 524/274 |
| 4,446,307 | 5/1984 | Shirk | 528/406 |
| 4,463,120 | 7/1984 | Collins et al. | 524/270 |
| 4,497,927 | 2/1985 | Tai et al. | 524/475 |
| 4,629,758 | 12/1986 | Kawaguchi et al. | 524/495 |
| 5,171,637 | 12/1992 | Stiberth | 428/436 |
| 5,306,130 | 4/1994 | King et al. | 425/17 |
| 5,371,136 | 12/1994 | Brooks et al. | 524/270 |
| 5,395,879 | 3/1995 | Murray | 524/270 |
| 5,425,824 | 6/1995 | Marwick | 156/64 |
| 5,527,846 | 6/1996 | Christell et al. | 524/270 |

*Primary Examiner*—Peter A. Szekely
*Attorney, Agent, or Firm*—Oldham & Oldham Co., L.P.A.

[57] ABSTRACT

The invention describes both a method for bonding at least two elastomeric substrates together, wherein one of the substrates is a tire casing and another substrate is a tire tread, and an aqueous color changeable adhesive for effecting the bonding. The method includes the steps of buffing at least one surface of at least one of the substrates to an RMA 2 or RMA 3, applying the color changeable aqueous adhesive to the at least one surface, drying the adhesive for at least a period of time to permit an initial light grey color of the adhesive as applied to change to a flat black, and contacting the substrates under pressure to bond the substrates together. The color changeable aqueous adhesive includes at least a rubber latex emulsion, a tackifier, a pH adjustment agent, and a carbon black emulsion, wherein the carbon black functions both as a reinforcing agent and a visible color indicia means for evaluating the degree of dryness of the adhesive, which correlates to the degree of tack of the adhesive. The carbon black is a lampblack.

28 Claims, No Drawings

5,807,918

COLOR CHANGEABLE AQUEOUS ADHESIVE SYSTEMS

TECHNICAL FIELD

The invention described herein pertains generally to an aqueous adhesive system with color indicia subsystem for visually measuring the degree of tackiness of a retread cement.

BACKGROUND OF THE INVENTION

With increasing environmental awareness, the use of retread cements which contain volatile organic compounds (VOCs) is rapidly decreasing while the switch to aqueous based retread cements is increasing. Solvent containing adhesives are commonly used in the tire manufacturing industry, because they are easy to work, particularly at low temperature, and generally provide a good quick bonding capacity and good adhesive strengths. However, a serious disadvantage of the solvent containing adhesives is the large quantity of organic solvents they contain. These are released by evaporation during working and thus, result in a considerable odor, which in some circumstances may lead to a health risk for the operator. Additionally, due to the volatile nature of these adhesives, explosive solvent/air mixtures may be produced.

While aqueous compositions have been used prior in the prior art, there is no teaching which shows the use of an aqueous based adhesive with a color indicia which indicates the degree of dryness of the adhesive. U.S. Pat. No. 5,425,824 to Marwick, published Jun. 20, 1995, teaches the use of an adhesive composition which is a mixture of a one-part heat-curable adhesive and a substantially water-insoluble indicator material which is substantially unreactive with the components of the one-part heat-curable adhesive, but which has the ability to produce a color change in the composition on curing of the adhesive. Preferably, the adhesive is a one-part heat-curable epoxy adhesive system whereas the indicator materials are ones that will not react substantially at room temperature with any of the components of the resin, the curing agent and the accelerator, if present.

The indicator materials respond only to the reactor within the adhesive during thermally-induced curing by changing color. Chemical indicators which were used must be substantially insoluble in water and would include bromocresol purpole, and color formers of the type described in the *Journal of the Society of Dyers and Colorists*, 105, April 1989, 171–172, an example of which is Reaktred 448, a fluoran color former produced by Badische Anilin and Soda Fabrik AG, and 1-2-benzo-6-diethylamine-fluoran.

The above reference however, fails to suggest that something as commercially prevalent as a particular form of carbon black, i.e., lampblack, may act in a similar capacity to the above exotic and expensive color indicator materials shown above.

SUMMARY OF THE INVENTION

In accordance with the present invention, there is provided an aqueous based color indicia system for visually measuring the degree of tackiness of a curable retread cement. More specifically, it relates to an adhesive system wherein the drying time of the adhesive and its resulting degree of tack, can be visually measured for use by an operator in applying a tire tread to a tire casing without resorting to measuring moisture levels in the adhesive or a timing device.

The color indicia system is essentially a water-insoluble indicator material which is substantially unreactive with the adhesive, but which has the ability to produce a visual color change in the composition upon drying of the adhesive.

These and other objects of this invention will be evident when viewed in light of the drawings, detailed description, and appended claims.

DETAILED DESCRIPTION OF THE INVENTION

The aqueous based color indicia system for visually measuring the degree of dryness which is directly correlatable to the tackiness of a retread cement comprises an elastomer, water, pH adjuster, and an optically visible color-change dryness indicator which co-functions as a reinforcing agent e.g., lampblack, and a tackifier.

Any natural or synthetic rubber may be employed in the adhesive compositions of this invention. A non-limiting exemplary list of candidate rubbers would include natural rubber and synthetic rubbers, e.g., polyisoprene, acrylonitrile-butadiene rubbers, styrene-butadiene rubbers, neoprene, butyl rubber, polybutadienes and ethylene-propylene-diene rubbery polymers. The diene used in the ethylene-propylene-diene polymer is usually a non-conjugated diene such as any of the one or more of those generally known in the art, e.g, 1,4-hexadiene, ethylidene norbornene or dicyclopentadiene. Rubbery or elastomeric ethylene-propylene-diene polymers and methods for preparing them are described in, for example, Rubber Chemistry and Technology, 45(1), March 1972. Mixtures of the above rubbers are also envisioned within the scope of this invention.

A preferred elastomer for use in this invention is Kagetex 2003 LATZ [CAS 9003-31-0 for the polymer] as sold by The Ore & Chemical Corporation, Virginia. This elastomer is a concentrated, centrifuged, low ammonia grade of natural latex, containing a secondary preservative system of tetramethylthiuramdisulfide and zinc oxide, which is used to prevent bacterial growth and to stabilize the latex. The total solids content is 61.5% with a dry rubber content of 60.0%. The alkalinity-ammonia content is between 0.5–0.75% on the water phase and 0.29% maximum on the latex phase. The viscosity at 60% total solids content is between 80–100 cps. The KOH number is between 0.55–0.65 and the pH ranges from 9.6 to 10.2. The mineral content ranges from 2–4 ppm Cu, 0.1–0.4 ppm Mn, and 5–5 ppm Mg. The volatile fatty acids number ranges from 0.01–0.05. The shelf life of the latex is 6–12 months. Another preferred elastomer is low ammonia centrifuged natural latex GNL 150 sold commercially by The Goodyear Tire & Rubber Co.

Accelerators and/or stabilizers and/or preservatives which may be employed in the adhesive compositions are compounds such as thiuram disulfide, selenium diethyldithiocarbamate, zinc dibutyldithiocarbamate, zinc diethyldithiocarbamate, zinc dimethyldithiocarbamate, zinc 2,2'-dithiobisbenzothiazole, tetramethylthiuram monosulfide, diphenylguanidine, N-cyclohexyl-2-benzothiazole sulfenamide, N-tert-butyl-2-benzothiazole sulfenamide, 2-mercaptobenzothiazole and benzothiazyl disulfide.

One key aspect of this invention involves the addition of a rubber reinforcing agent which coacts as a dryness indicator. An example of such a co-functional ingredient is lampblack. The amount of lampblack added is typically from approximately 0.5 to 5% by weight. The lampblack is typically purchased as an aqueous paste. The preferred lampblack known to date is E8678 carbon black as sold by Akrochem, Akron, Ohio. This form of carbon black as a particle size of approximately 75 nm, with a DBP (dibutyl phthalate) absorption of 63 cm$^3$/100 gm. A pH of 8.0 is typical with 1% volatiles maximum. The tint strength is 64 (ASTM D 3265) and specific gravity is 1.8.

While lampblack is generally referred to as a form of carbon black, it has properties which are markedly different from carbon blacks in general. It is made by burning low-grade heavy oils or similar carbonaceous materials with insufficient air, and in a closed system such that the soot can be collected in settling chambers. Lampblack is strongly hydrophobic and is nonflammable. Other, more typical forms of carbon black include channel black (also called impingement black), furnace black and thermal black. Channel black is generally characterized by lower pH, higher volatile content, and less chainlike structure between the particles. It has the smallest particle size (largest specific surface area) of any industrial material. The particles are in the colloidal range. The surface area runs to about 18 acres per pound. Its chief use is as a reinforcing agent for rubber (tire treads), and increases both abrasion and oil resistance. Thermal black consists of relative coarse particles and is used primarily as a pigment. Furnace black produced from natural gas and has an intermediate particle size while that produced from oil can be made in a wide variety of controlled particles sizes and is particularly suitable for reinforcing synthetic rubber.

Carbon blacks differ from other forms of bulk carbon such as diamond, graphite, cokes, and charcoal in that they are particulate, composed of aggregates having complex configurations, quasi graphitic in structure, and of colloidal dimensions. They differ from other bulk carbons in having their origin in the vapor phase through the thermal decomposition and the partial combustion of hydrocarbons.

A number of processes have been used to produce carbon black including the oil-furnace, impingement (channel), lampblack, and the thermal decomposition of natural gas and acetylene. These processes produce different grades of carbon and are referred to by the process by which they are made, e.g., oil-furnace black, lampblack, thermal black, acetylene black, and channel-type impingement black. The reason for this variety of processes, is that there exists a unique link between manufacturing process and performance features of the carbon black and not all features are attainable by the products which result from each process. The different grades from the various processes have certain unique characteristics.

Various classification schemes are used in the categorization of carbon blacks. Classification may be by abrasion resistance, i.e., high abrasion furnace (HAF), intermediate super abrasion furnace (ISAF), and super abrasion furnace (SAF); by reinforcement, i.e., semi-reinforcing furnace (SRF); by a vulcanizate property, i.e., high modulus furnace (HMF); by a rubber processing property, i.e., fast extrusion furnace (FEF); by usefulness, i.e., general purpose furnace (GPF), and all-purpose furnace (APF); by "particle" size, i.e., fine furnace (FF) and large particle size furnace (LPF); and on electrical conductive properties, i.e., (XPF).

The obvious inadequacies of this unwieldy classification procedure lead the ASTM committee D-24 on carbon black to establish a letter and number system. In the ASTM system, the N-series numbers increase as $I_2$ absorption values or surface areas decrease. The SAF grades have designated numbers from N100–N199; the ISAF grades, N200–N299; the HAF grades, N300–N399; the FF and XCF grades, N400–499; the FEF grades, N500–599; the HMF, GPF, and APF grades, N600–699; the SRF grades, N700–799; fine thermal (FT) has been designated as N880, and medium thermal (MT) N990.

Acetylene Black Process

The high carbon content of acetylene (92%) makes it attractive for conversion to carbon. It decomposes exothermically at high temperatures, a property which was the basis of an explosion process initiated by electrical discharge. Acetylene black is made by a continuous decomposition process at 800°–1000° C. in water-cooled metal retorts lined with a refractory. The process is started by burning acetylene and air to heat the retort to reaction temperature, followed by shutting off the air supply to allow the acetylene to decompose to carbon and hydrogen in the absence of air. The large heat release requires water cooling in order to maintain a constant reaction temperature. The high carbon concentration, high reaction temperature and relatively long residence time produce a unique type of carbon black. After separation from the gas stream it is very fluffy with a bulk density of only 19 kg/m$^3$ (1.2 lb/ft$^3$). Acetylene black is difficult to compact by compression and resists pelletization. Commercial grades are compressed to various bulk densities up to a maximum of 200 kg/m$^3$ (12.5 lb/ft$^3$).

It is the purest form of carbon black with a carbon content of 99.7%, and a hydrogen content of 0.1%. It has the highest aggregation with a DBPA value of 250 cm$^3$/100 g. X-ray analysis indicates that it is the most crystalline or graphitic of the commercial blacks. These features result in a product with low surface activity, low moisture adsorption, high liquid adsorption, and high electrical and thermal conductivities.

A major use for acetylene black is in dry cell batteries because it contributes low electrical resistance and high capacity. In rubber it gives electrically conductive properties to heater pads, heater tapes, antistatic belt drives, conveyor belts, and shoe soles. It is also used in electrically conductive plastics. Some applications of acetylene black in rubber depend on its contribution to improved thermal conductivity, such as rubber curing bags for tire manufacture.

Lampblack Process

The lampblack process has the distinction of being the oldest and most primitive carbon black process still being practiced. The ancient Egyptians and Chinese employed techniques similar to modern methods collecting the lampblack by deposition on cool surfaces. Basically, the process consists of burning various liquid or molten raw materials in large, open, shallow pans 0.5 to 2 m in diameter and 16 cm deep under brick-lined flue enclosures with a restricted air supply. The smoke from the burning pans passes through low velocity settling chambers from which the carbon black is cleared by motor-driven ploughs. In more modern installations the black is separated by cyclones and filters. By varying the size of the burner pans and the amount of combustion air, the particle size and surface area can be controlled within narrow limits. Lampblacks have similar properties to the low area oil-furnace blacks. A typical lampblack has an average particle diameter of 65 nm, a surface area of 22 m$^2$/g, and a DBPA of 130 mL/100 g. Its main use is in paints, as a tinting pigment where blue tone is desired.

Channel Black Process

The channel black process has had a long and successful history, beginning in 1872 and ending in the United States in 1976. Small quantities are still produced in a few scattered plants operating in Germany (roller-process using oil), Eastern Europe, and Japan. Rising natural gas prices, smoke-pollution, low yield, and the rapid development of furnace process grades caused the termination of channel black production in the United States.

The name channel black came from the use of steel channel irons whose flat side was used to collect carbon black deposited from many small flames in contact with its surface. The collecting channels and thousands of flames issuing from ceramic tips were housed in sheet metal buildings, each 35–45 m long, 3–4 m wide, and about 3 m high. The air supply came from the base of these buildings, the waste gases, containing large quantities of undeposited product, were vented to the atmosphere as a black smoke. Carbon black was removed from the channels by scrapers and fell into hoppers beneath the channels. Yields were very low, in the range of 1–5%. The blackest pigment grades had the lowest yields. The product was conveyed from the hot houses to a processing unit where grit, magnetic scale, coke, and other foreign material were removed. From an initial bulk density of 80 kg/m$^3$ (5 lb/ft$^3$) it was compacted and pelletized to over 400 kg/m$^3$ (25 lb/ft$^3$) for use in rubber. Lower bulk densities were used for pigment applications.

Channel blacks are surface oxidized as a result of their exposure to air at elevated temperatures on the channel irons. Due to surface oxidation, the particles are slightly porous. These features influence performance in most applications.

Oil-Furnace Process

The feedstocks for the oil-furnace process are essentially hydrocarbon oils. They are specified to be free of coke and other gritty materials, possess high aromaticity, and contain low levels of asphalt, sulfur, and alkali metals. The oil-furnace process involves a partial combustion of the hydrocarbon feed, followed by quenching to reduce the temperatures rapidly from 1300°–1600° C. to 1000° C., which protects the newly formed carbon black aggregates. The product passes through heaters, where the combustion air is preheated, and is quenched again at 270° C. prior to collection of the carbon black in glass bag filters. The carbon black is ground or micropulverized and stored. Carbon blacks are pelletized by dry or wet methods to provide a low dusting or nondusting product.

Thermal Process

This process is similar to that described previously for the acetylene process, with the exception of the feedstock used, hydrocarbons rather than acetylene.

TABLE 1

| | Carbon Black | | | | | |
|---|---|---|---|---|---|---|
| Property | Furnace HAF N330 | Thermal MT N990 | Thermal FT N880 | Acetylene | Channel EPC S300 | Lamp black |
| avg. particle dia. (nm) | 28 | 500 | 180 | 40 | 28 | 65 |
| surface area (BET) m$^2$/g | 75 | 47 | 13 | 65 | 115 | 22 |
| DBPA mL/100g | 103 | 36 | 33 | 250 | 100 | 130 |

TABLE 1-continued

| | Carbon Black | | | | | |
|---|---|---|---|---|---|---|
| Property | Furnace HAF N330 | Thermal MT N990 | Thermal FT N880 | Acetylene | Channel EPC S300 | Lamp black |
| tinting strength % SRF | 210 | 35 | 65 | 108 | 180 | 90 |
| benzene extract | 0.06% | 0.30% | 0.80% | 0.10% | 0.00% | 0.20% |
| pH | 7.5 | 8.5 | 9.0 | 4.8 | 3.8 | 3.0 |
| volatiles | 1.00% | 0.50% | 0.50% | 0.30% | 5.00% | 1.50% |
| % ash | 0.40% | 0.30% | 0.10% | 0.00% | 0.02% | 0.02% |
| % C | 97.90% | 99.30% | 99.20% | 99.70% | 95.60% | 98.00% |
| % H | 0.40% | 0.30% | 0.50% | 0.10% | 0.60% | 0.20% |
| % S | 0.60% | 0.01% | 0.01% | 0.02% | 0.20% | 0.80% |
| % O | 0.70% | 0.10% | 0.30% | 0.20% | 3.50% | 0.80% |

Selection of a carbon black depends on the black's performance characteristics, which are governed by particle size, surface area, structure or morphology, chemical composition, and surface chemistry. Carbon blacks are intermediate in crystallinity between the crystalline graphite and the amorphous structure of coal. Carbon blacks have surface areas of 6–1100 m$^2$/g and particle sizes of 10–500 nm. With carbon black the term particle does not refer to an individual, discrete particle, but to a group of particles which are fused together and form a primary aggregate. The structure of carbon black is controlled during manufacture and is characterized as low, medium, or high; these designations refer to the size and configuration of the primary aggregates. High structure carbon blacks consist of relatively large, highly branched aggregates, whereas low structure blacks are composed of compact aggregates.

Typical properties of carbon black pigments as they relate to particle size and structure are listed in Table 1. Carbon blacks have a density of 1.8 g/cm$^3$. Oil-absorption values differ. One method which is employed to measure oil absorption is the use of a Brabender/Cabot absorptometer by which the dibutyl phthalate (DBP) absorption number is determined. Some typical DBP absorption values are acetylene black, 250 mL/100 g solvent; thermal black, 33 mL/100 g, lamp black, 130 mL/100 g; furnace black, 103 mL/100 g and channel black, 100 mL/100 g.

Other conventional components which may be included in the adhesive composition are vulcanizing agents, such as elemental sulfur and sulfur-containing compounds. Other vulcanizing agents which may be employed are organic peroxides, metallic oxides, selenium and tellurium. Generally, the amount of vulcanizing agent present in the adhesive composition will vary somewhat with the amount or rubber. Preferably, no supplemental vulcanizing agents are added to the commercially purchasable rubbers.

Examples of other compounding ingredients which may be employed in the adhesive composition are zinc oxide, magnesium oxide and fatty acids having from 10 to 22 carbon atoms, such as lauric acid, palmitic acid and stearic acid. Mixtures of fatty acids may also be used as accelerators in the adhesive compositions. Typically, these components are already present in the commercially purchased rubbers, but may be added in incremental amounts to the composition for specialized applications.

Although natural rubber has some tack, the strength developed is inadequate for many uses. Most of the commercially available forms of synthetic elastomers have little tack either for themselves or other surfaces. Tackifiers are added to these systems to increase tack, a measure of the degree of bonding between the tire carcass and the tire tread. An exemplary list of tackifiers includes modified wood rosins, derivatives of wood rosin and modified rosin, polyterpene resins, coumarone-indene resins and phenolic-modified coumarone-indene resins. One preferred example of a tackifying agent is Aquatac, a rosin ester emulsion (CAS 133874-92-7), a complex combination derived from tall oil. It is composed primarily of tricyclic monocarboxylic acids, mainly abietic and dehydroabietic acids, and includes tall-oil rosin stabilized by catalytic disproportionation.

Thickening agents are also typically added to the adhesive formulation to control the sprayability thereof. One preferred example of this type of agent is Alcogum, a sodium polyacrylate, (methacrylic acid-ethyl acrylate copolymer).

In the following description, reference will be made to the invention as it applies to the bonding of a tire tread to a tire casing. However, it is to be understood that the invention is not limited to that particular application, and may be employed in the fabrication of other laminated elastomeric articles, such as for example, conveyor belts, hoses, and the like.

The tire casing and tread substrates which are to be used are formed from rubber compounds which have been cured according to conventional techniques. Such rubber compounds contain olefinic unsaturation in their polymer chains and include natural rubber, synthetic polyisoprene, polybutadiene, butadiene-isoprene copolymers, rubbery copolymers of butadiene and styrene, rubbery copolymers of butadiene and acrylonitrile, rubbery copolymers of isoprene and isobutylene, polychloroprene, ethylene-propylene rubbers, and the like.

The term "natural rubber" as used herein means an elastomeric substance obtained from various trees and plants which generally grow in the tropics or desert portions of the world. Natural rubber contains a very high cis-content, typically in excess of 90% or more of cis-1,4-polyisoprene.

Prior to subjecting the tire casing to the priming treatment, the casing is allowed to equilibrate at ambient indoor temperature and humidity for a period of time, typically from about several minutes to 15 hours. Visible moisture on the casing is removed and holes or other damage to the casing are repaired.

Since the adhesive is an aquous based adhesive, it is important that the adhesive not come into direct contact with steel cables or body plies, which would have the potential of rusting. Repair cements as supplemented as necessary with filler extruder rope or caulking gum should be applied to the affected areas.

The surface of the casing onto which the tread is to be bonded is then subjected to a conventional buffing procedure in order to clean the surface and provide a roughened surface to enhance bonding with the tread. The buffing is carried out using conventional tire buffing equipment. Buffing of the casing is carried out until the desired buffing depth and casing surface radius are obtained, in accordance with predetermined tire specifications, which generally mean to a texture of RMA 2 (Rubber Manufacturers Association Standard) or RMA 3. When the buffing is too rigorous, i.e., RMA 4 or RMA 5, then the adhesive puddles, leading to improper drying and poor adhesion.

The tire tread may optionally be subjected to buffing to clean the surface of any contaminants and to roughen the surface. The term "tire tread" as used herein is intended to include not only conventional tire tread provided with grooves and/or lugs, but also "build-up". Build-up is a strip of cured rubber which does not have any tread thereon and is designed to provide a thickened surface on the tire casing prior to the application of the tire tread.

Since the adhesive is an aqueous based system, mixing of the adhesive is critical in that after short storage times, the adhesive will separate, with a low or thin viscosity material at the bottom and a higher, thick viscosity material at the top. Proper mixing insures a homogeneous viscosity throughout the product. One specialized form of equipment which is particularly suited for use with this adhesive and in the tire retread business is a spray applicator.

This applicator typically uses air pressure to atomize the adhesive through a spray gun. In order to minimize any chance of contamination, oil filters and moisture traps are typically placed on the inlet air side of the equipment. A fluid pressure of about 20 psi is maintained in the liquid while an atomizing pressure of 50–55 psi is generally used for the spray gun. Prior to the use of the adhesive, it should be mixed for at least 2 minutes and checked. Adhesive which has been exposed to temperatures below 38° F. or greater than 140° F. will tend to gel or separate and will not be effective for the intended application.

Prior to each use, the adhesive should be mixed for about 10 minutes and the spray nozzle flushed for about 2 minutes to remove any cleaning solution which may have been used previously to clean the nozzle. The adhesive should always be remixed for 2 minutes after about 4 hours of use time.

Application of the adhesive is typically via spraying with an 8–10" spray pattern desired. A spray gun is typically held about 8–10" away from the buffed rotating tire carcass and a light even application of adhesive is applied with 4–5 slow revolutions of the tire. In a preferred embodiment, the application of adhesive is performed so as to minimize overspraying adhesive onto other tires to which adhesive has previously been applied.

The applied adhesive is allowed to dry for a period of about 20–40 minutes, preferably 20–30 minutes, although this time will be a function of the quantity of adhesive applied. The adhesive as applied is a light grey, and upon proper drying and resulting desired degree of tack, the color of the adhesive will change to a flat black. This distinct visual indicator of dryness and tack, is achievable by the use of lampblack as the color indicia. Other forms of carbon blacks do not produce this distinct color change, the adhesive going on as a dark grey to begin, with the final color being an even darker grey. This makes it visually difficult for an operator to determine when the proper degree of tack has been developed.

In a preferred embodiment of this invention, the color change described for this invention, i.e., light grey to dull black, can be measured with reference to Federal Standard Colors, Federal Standard 595B (1989), wherein non-limiting exemplary light greys would include 16099, 26118, 26099, 26008, 36118 and 36099. Similarly, non-limiting exemplary dull blacks would include 27040, 37030 and 37031. Of course, it is recognized that the color perceived is often dependent upon viewing angle. Thought of in another way, using the RGB color value standard wherein each color value for each color ranges from 0 to 255, a color of grey is only achieved when all three values for red, green and blue are essentially equal, with some minor variations between the numeric color values being permitted. The shade of grey (i.e., greyscale) is then determined by the HSL values for hue, saturation and luminosity (or brightness), the values ranging from 0 to 239 for hue, and 0–240 for saturation and luminosity. With the color of grey, the value for hue is relatively insensitive to various changes in greyscale color, saturation values are essentially zero and the most sensitive parameter is luminosity, ranging from 239 (light grey) to 0 (black). It is not possible for the H and S values to be zero and the L value to equal 240 and still achieve a grey color, this combination leading to white. Therefore, in its simplest form, the invention relates to a greyscale color change wherein the RGB values are essentially equal and the brightness change is at least 5%, preferably 10%, and more preferably, 30% or more as measured against the total value of the scale.

An exemplary grey to black color change under the RGB/HSB system would have values as follows in Table 2.

TABLE 2

| Color | R Red (0–255) | G Green (0–255) | B Blue (0–255) | H Hue (0–239) | S Saturation (0–240) | L Luminosity (0–240) |
|---|---|---|---|---|---|---|
| Light Grey | 65 | 65 | 65 | 0 | 0 | 123 |
| Black | 65 | 65 | 65 | 0 | 0 | 61 |

Alternatively, acceptable color changes would also be visible with the following numeric values of the above parameters as shown in Table 3.

TABLE 3

| Color | R Red (0–255) | G Green (0–255) | B Blue (0–255) | H Hue (0–239) | S Saturation (0–240) | L Luminosity (0–240) |
|---|---|---|---|---|---|---|
| Light Grey | 131 | 126 | 130 | 214 | 4 | 121 |
| Black | 67 | 65 | 66 | 214 | 4 | 62 |

It is of course that a wide variety of combinations will yield the desired color changes as shown above for two examples, the above numeric values having been derived by a comparison of the Federal Standard Color swatches with the Color Palette in Win-OS/2® Windows 3.1 running under OS/2 Warp®, although similar values are obtainable using the same Color Palette for computers running DOS®/Windows 3.1®. The color change essentially depends upon the values for RGB as being essentially the same and the luminosity varying by at least 5% of the permissible range, more preferably 10%, and most preferably 20%. The permissible value for the saturation must be kept fairly low, typically 0–10, more preferably 0–5, and most preferably 0.

After application of the adhesive is completed, the tread and casing are brought together and the ends of the tread stapled together to hold in place on the casing. The tire is "stitched" by applying pressure to the tread using rollers or the like. The stitching process more evenly distributes the adhesive between the casing and the tread. In general, there is a 48 hour window during which the adhesive is effective in bonding the tread to the carcass. Longer periods of time lead to surface oxidation and contamination leading to bond failure. Preferably, the operator will wait no longer than 4 hours prior to applying the tire tread to the tire carcass.

The best mode for carrying out the invention will now be described for the purposes of illustrating the best mode known to the applicant at the time. The examples are illustrative only and not meant to limit the invention, as measured by the scope and spirit of the claims.

The following components were mixed together in the following proportions.

TABLE 4

| Component | Weight Formula | Weight Active Ingredients | Weight Other Solids[a] | Weight Water |
|---|---|---|---|---|
| Kagetex 2003 LATZ Natural Rubber Latex Emulsion | 55.28% | 33.17% | 0.83% | 21.28% |
| Aquatac 6085 Rosin Ester Emulsion | 17.54% | 10.00% | 0.70% | 6.84% |
| E-8678 Lampblack Emulsion | 2.50% | 1.00% | 0.30% | 1.20% |
| Alcogum NLT Sodium Polyacryate | 2.00% | 0.25% | | 1.75% |
| KOH | 0.16% | 0.07% | | 0.09% |
| Distilled Water | 22.52% | | | 22.52% |
| TOTALS | 100.00% | 44.49% | 1.83% | 53.68% |

(a)Consists of surfactants, dispersing agents, emulsifiers, preservatives, stabilizers and/or unknown ingredients in the above products.

The percentages listed above are illustrative of the best mode known to the applicants at the time of the filing of this application. Envisioned to be effective in this invention are a broader range of values for the weight percent of the active ingredients. The natural latex rubber emulsion is envisioned to be effective between 12–58 weight percent, more preferably from 27–43 weight percent, the rosin ester emulsion between 1–20 weight percent, more preferably from 5–15 weight percent, the lampblack emulsion between 0.1 to 5 weight percent, more preferably from 0.3–1.7 weight percent and the pH adjuster between 0.01 to 0.6 weight percent, more preferably from 0.02 to 0.2 weight percent.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A color changeable initially tacky aqueous adhesive comprising on an active ingredients basis:

from 12 to 58 weight percent of a rubber latex;

from 1 to 20 weight percent of a tackifier;

from 0.01 to 0.06 weight percent of a pH adjustment agent; and from 0.04 to 2 weight percent of a lampblack, wherein the lampblack functions both as a reinforcing agent and a visible color indicia means for evaluating the degree of dryness of the adhesive, which correlates to the degree of tack of the adhesive, said adhesive being initially a gray when applied and changing to a black when dry.

2. The adhesive of claim 1 wherein the weight percent of active ingredients is from 27 to 43 weight percent for the rubber latex, from 5 to 15 weight percent for the tackifier, from 0.02 to 0.2 weight percent for the pH adjustment agent and from 0.12 to 0.68 weight percent for the lampblack, with a balance of water.

3. The adhesive of claim 1 wherein the adhesive has essentially equal values of red, blue and green, essentially a zero value for saturation and a luminosity value which changes by at least 5% as the color changes from grey to black.

4. The adhesive of claim 3 wherein the luminosity value changes by at least 10%.

5. The adhesive of claim 4 wherein the luminosity value changes by at least 20%.

6. The adhesive of claim 1 which further comprises a thickening agent.

7. The adhesive of claim 5 wherein the thickening agent is a polyacrylate.

8. The adhesive of claim 1 wherein the rubber latex emulsion is selected from the group consisting of natural rubber and synthetic rubbers.

9. The adhesive of claim 8 wherein the synthetic rubbers are selected from the group consisting of polyisoprene, acrylonitrile-butadiene rubbers, styrene-butadiene rubbers, neoprene, butyl rubber, polybutadienes and ethylene-propylene-diene rubbery polymers.

10. The adhesive of claim 9 wherein
the diene contained in the ethylene-propylene-diene polymer is a non-conjugated diene.

11. The adhesive of claim 10 wherein the diene is selected from the group consisting of 1,4-hexadiene, ethylidene norbornene and dicyclopentadiene.

12. A color changeable initially tacky aqueous adhesive comprising on an active ingredients basis:
about 12 to 58 weight percent of a rubber latex;
about 5 to 15 weight percent of a tackifier;
about 0.02 to 0.2 weight percent of a pH adjustment agent; and
about 0.04 to 2 weight percent of a lampblack, wherein
the lampblack functions both as a reinforcing agent and a visible color indicia means for evaluating the degree of dryness of the adhesive, which correlates to the degree of tack of the adhesive,
said adhesive being initially grey when applied and changing to a black when dry,
said lampblack being added in an effective amount sufficient to change a luminosity value by at least 10% as the color changes from grey to black, and further wherein
said adhesive has essentially equal values of red, blue and green, essentially a zero value for saturation.

13. The adhesive of claim 12 wherein the luminosity value changes by at least 20%.

14. The adhesive of claim 12 which further comprises a thickening agent.

15. The adhesive of claim 14 wherein the thickening agent is a polyacrylate.

16. The adhesive of claim 12 wherein the rubber latex emulsion is selected from the group consisting of natural rubber and synthetic rubbers.

17. The adhesive of claim 16 wherein the synthetic rubbers are selected from the group consisting of polyisoprene, acrylonitrile-butadiene rubbers, styrene-butadiene rubbers, neoprene, butyl rubber, polybutadienes and ethylene-propylene-diene rubbery polymers.

18. The adhesive of claim 12 wherein
the diene contained in the ethylene-propylene-diene polymer is a non-conjugated diene.

19. The adhesive of claim 18 wherein the diene is selected from the group consisting of 1,4-hexadiene, ethylidene norbornene and dicyclopentadiene.

20. A color changeable initially tacky aqueous adhesive comprising on an active ingredients basis:
from 12 to 58 weight percent of a rubber latex,
said rubber latex being selected from the group consisting of natural rubber and synthetic rubbers and further wherein the synthetic rubbers are selected from the group consisting of polyisoprene, acrylonitrile-butadiene rubbers, styrene-butadiene rubbers, neoprene, butyl rubber, polybutadienes and ethylene-propylene-diene rubbery polymers;
from 1 to 20 weight percent of a tackifier;
from 0.01 to 0.06 weight percent of a pH adjustment agent; and
from 0.04 to 2 weight percent of a lampblack,
wherein the lampblack functions both as a reinforcing agent and a visible color indicia means for evaluating the degree of dryness of the adhesive, which correlates to the degree of tack of the adhesive, said adhesive being initially a gray when applied and changing to a black when dry.

21. The adhesive of claim 20 wherein the diene contained in the ethylene-propylene-diene polymer is a non-conjugated diene.

22. The adhesive of claim 21 wherein the diene is selected from the group consisting of 1,4-hexadiene, ethylidene norbornene and dicyclopentadiene.

23. The adhesive of claim 20 wherein the weight percent of active ingredients is
from 27 to 43 weight percent for the rubber latex,
from 5 to 15 weight percent for the tackifier,
from 0.02 to 0.2 weight percent for the pH adjustment agent and
from 0.12 to 0.68 weight percent for the lampblack,
with a balance of water.

24. The adhesive of claim 20 wherein the adhesive has essentially equal values of red, blue and green, essentially a zero value for saturation and a luminosity value which changes by at least 5% as the color changes from grey to black.

25. The adhesive of claim 24 wherein
the luminosity value changes by at least 10%.

26. The adhesive of claim 25 wherein
the luminosity value changes by at least 20%.

27. The adhesive of claim 20 which further comprises a thickening agent.

28. The adhesive of claim 27 wherein
the thickening agent is a polyacrylate.

* * * * *